(12) United States Patent
Kuwahara et al.

(10) Patent No.: US 7,206,690 B2
(45) Date of Patent: Apr. 17, 2007

(54) VEHICLE CONTROL APPARATUS

(75) Inventors: Seiji Kuwahara, Toyota (JP); Masato Kaigawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/313,799

(22) Filed: Dec. 22, 2005

(65) Prior Publication Data
US 2006/0155451 A1    Jul. 13, 2006

(30) Foreign Application Priority Data
Jan. 13, 2005    (JP)    ............... 2005-006689

(51) Int. Cl.
*G06F 17/00* (2006.01)
*B60K 41/60* (2006.01)

(52) U.S. Cl. ............... 701/110; 477/111; 123/399

(58) Field of Classification Search ............... 701/110, 701/114, 102; 477/111; 123/399, 361
See application file for complete search history.

(56) References Cited

U.S. PATENT DOCUMENTS 4,627,311 A * 12/1986 Yokooku et al. ............ 701/54
5,251,138 A    10/1993  Katayama
6,652,417 B2 * 11/2003  Iriyama .................. 701/110
2002/0065597 A1    5/2002  Katakura et al.
2003/0105573 A1    6/2003  Ishizu et al.
2003/0135320 A1    7/2003  Bellinger

FOREIGN PATENT DOCUMENTS

JP    2002-161772    6/2002

* cited by examiner

*Primary Examiner*—Hieu T. Vo
(74) *Attorney, Agent, or Firm*—Oblon, Spivak, McClelland, Maier & Neustadt, P.C.

(57) ABSTRACT

An engine ECU executes a program including a request drive force converted into an engine torque falls out of a saturation region, a step of calculating the target opening degree of a throttle, the request drive force converted into the engine torque falls in the saturation region, and the request drive force calculated on the basis of the opening degree of an acceleration converted into the engine torque falls in the saturation region.

14 Claims, 4 Drawing Sheets

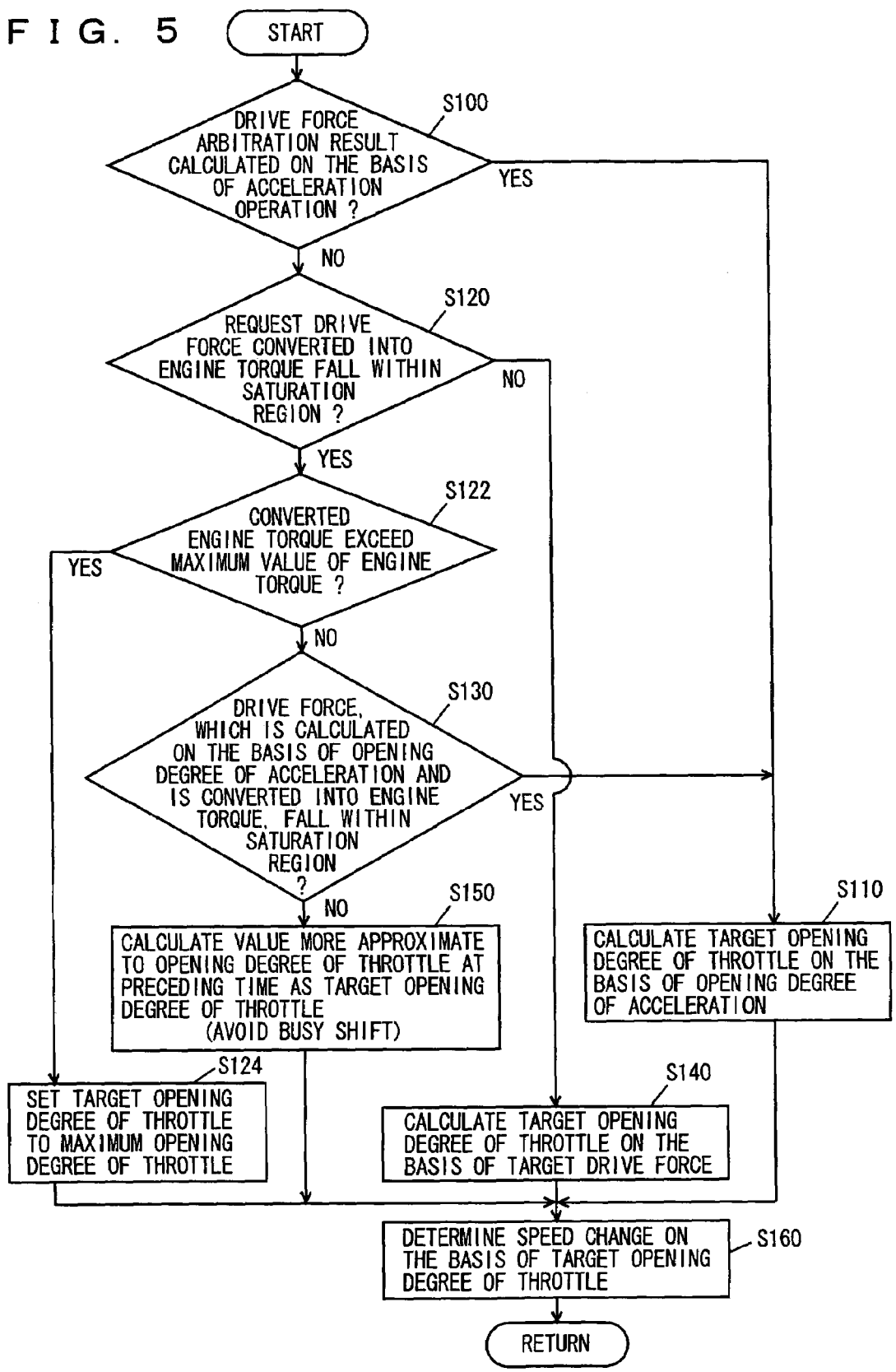

VEHICLE CONTROL APPARATUS

This nonprovisional application is based on Japanese Patent Application No. 2005-006689 filed with the Japan Patent Office on Jan. 13, 2005, the entire contents of which are hereby incorporated by reference.

BACKGROUND OF THE INVENTION

1. Field of the Invention

The present invention relates to a vehicle control apparatus. In particular, the present invention relates to an apparatus which controls an object having a possibility that requests may interfere with each other.

2. Description of the Background Art

There has been recently shown an increasing tendency to mount, on one and the same vehicle, many kinds of movement control apparatuses for controlling the movement of the vehicle. On one and the same vehicle have been installed, for example, movement control apparatuses for a VSC (Vehicle Stability Control), a VDIM (Vehicle Dynamics Integrated Management), an ABS (Antilock Braking System), a TRC (TRaction Control), an operation-assisted control (such as a cruise control, a follow-up control and a pre-crush control), a navigation ganged speed change control and the like. These movement control apparatuses are directed to a drive system (such as an engine and an automatic transmission), a brake system (such as a brake) and a steering system (such as a steering wheel).

However, respective effects to be produced by the different kinds of movement control apparatuses have been not always implemented independently of each other. If anything, the effects possibly have interfered with each other. Therefore, it has been important to control an object to be controlled in satisfactory association and cooperation among a plurality of kinds of movement control apparatuses in a vehicle mounting thereon the movement control apparatuses.

For example, both of a drive force request for the drive system from the aforementioned movement control apparatus and another drive force request by the operation of an acceleration pedal by a driver have been directed to the control of the drive system, thereby possibly inducing a fear of an interference with each other. In such a case, mutually contradictory requests may be possibly input into the drive system.

One example of drive force control apparatuses in the conventional art is disclosed in Japanese Laid-Open Patent Publication No. 2002-161772. The drive force control apparatus has allowed a driver to hardly feel an insufficient acceleration performance and abnormality caused by occurrence of a dead band. The drive force control apparatus has controlled a shift-wise automatic transmission whose speed change shift is controlled on the basis of a speed change line, a map for setting a target drive force according to a vehicle speed and an acceleration pedaling quantity, and an engine whose output is controlled to become the target drive force, wherein the map is disposed per speed change shift and is switched according to the speed change shift.

With the drive force control apparatus, the map for determining the target drive force has been disposed per speed change shift, and further, it has been switched according to the speed change shift. As a consequence, an optimum target drive force can be set per speed change shift without any adverse influence of hysteresis during the speed change. However, the speed change of the shift-wise automatic transmission has been determined on the basis of an opening degree of an acceleration pedal and a vehicle speed in the drive force control apparatus disclosed in Japanese Laid-Open Patent Publication No. 2002-161772, thereby raising problems, as follows. For example, in the case where a vehicle starts to climb a slope after the speed change shift of the automatic transmission is changed from a second shift to a third shift by increasing an opening degree of an acceleration pedal by a driver, the speed cannot be changed despite of an increase in drive force request until the driver depresses the acceleration pedal in excess of a down shift line. As a result, the target drive force cannot be achieved with a maximum generation drive force in the third shift, thereby inducing a possibility that the driver feels abnormality.

In the meantime, in a speed change control in association with a navigation device, the condition of a road (such as an up or down slope, a curve or an intersection), on which a vehicle travels, has been read from the navigation device in advance, so that an optimum shift control can be performed. It has been determined, for example, on an up or down slope, as to whether a road is an up slope or a down slope on the basis of the condition of the road from the navigation device, an opening degree of a throttle, a vehicle speed and the like. As a consequence, an unnecessary up-shift can be suppressed so as to achieve an optimum drive force on the up slope.

Even if the speed change is determined on the basis of the vehicle speed and the opening degree of a throttle in place of the opening degree of the acceleration pedal, as disclosed in Japanese Laid-Open Patent Publication No. 2002-161772, a drive force request by the movement control apparatus which performs the speed change control in association with the navigation device may be possibly contradictory to a drive force request by the driver. Such a problem is not taken in Japanese Laid-Open Patent Publication No. 2002-161772.

Furthermore, in the case where the speed change is determined on the basis of the speed change map consisting of the opening degree of a throttle and the vehicle speed, there have arisen problems, as described below. In the case of an internal combustion engine serving as a drive source for a vehicle, a generation torque has been increased as the opening degree of a throttle is increased. In either of the case where the drive force request from the movement control apparatus is increased and the case where the drive force request according to the operation by the driver is increased, the drive force could be basically increased by increasing the opening degree of a throttle. However, when the opening degree of a throttle becomes greater to some extent, the drive force generated in the internal combustion engine has been saturated in view of its characteristics. This signifies that the drive force is only slightly varied (that is, is not increased) even if the opening degree of a throttle is greatly varied. Consequently, if there is a drive force request for slightly increasing the drive force (which is either the drive force request from the movement control apparatus or the drive force request according to the operation by the driver), the opening degree of a throttle has been largely varied. As a result, the opening degree of a throttle on the speed change map has been largely varied accordingly, thereby inducing a possibility of a busy shift in which an up shift or a down shift is repeated.

SUMMARY OF THE INVENTION

The present invention aims to provide a vehicle control apparatus, which can control a drive system in consideration of both of a drive force request by a driver and a drive force request by the vehicle control apparatus.

A control apparatus for a vehicle according to the present invention controls a vehicle including an internal combustion engine and an automatic transmission connected to the internal combustion engine. The control apparatus includes an acceleration opening degree detection part which detects an opening degree of an acceleration pedal, a target drive force setting part which sets a target drive force on the basis of the detected acceleration pedal opening degree, a first throttle opening degree calculation part which calculates an opening degree of a throttle on the basis of the detected acceleration pedal opening degree, a second throttle opening degree calculation part which calculates an opening degree of a throttle corresponding to the set target drive force, a determination part which determines as to whether or not a speed is changed in the automatic transmission on the basis of the calculated throttle opening degree, and a selection part which selects either one of the throttle opening degree calculated by the first throttle opening degree calculation part and the throttle opening degree calculated by the second throttle opening degree calculation part on the basis of a predetermined condition. The determination part determines as to whether or not the speed is changed on the basis of the selected throttle opening degree.

According to the present invention, the characteristics of the internal combustion engine include a saturation region in which a drive force generated in the internal combustion engine is saturated when the opening degree of a throttle becomes great to some extent. A control quantity with respect to the internal combustion engine is regarded as the target drive force, thereby achieving a more direct control. However, the opening degree of a throttle is largely varied in the saturation region even in the case of a small change in target drive force. Therefore, if the opening degree of a throttle calculated according to the target drive force is used in such a region, the opening degree of a throttle is largely varied, and accordingly, there is a possibility of an unnecessary speed change carried out by the determination part. In view of this, the selection part selects the opening degree of a throttle calculated on the basis of the opening degree of an acceleration pedal in such a saturation region, and in contrast, selects the opening degree of a throttle calculated on the basis of the target drive force out of the saturation region. As a consequence, it is possible to provide the vehicle control apparatus, which can control the drive system in consideration of both of the drive force requested by the driver and the drive force requested by the vehicle control apparatus.

Preferably, the control apparatus further includes an automatic target drive force setting part which sets a target drive force not caused by operation by a driver.

According to the present invention, the opening degree of a throttle is calculated on the basis of any one of the target drive force according to the operation by the driver, the target drive force not caused by the operation by the driver, and the acceleration operation by the driver, and as a result, the drive system can be controlled by the use of the opening degree of a throttle.

More preferably, the control apparatus further includes a processing part which determines as to whether or not the throttle opening degree calculated by the second throttle opening degree calculation part falls within a saturation region in which a rate of a change in throttle opening degree with respect to a change in drive force becomes greater than a predetermined value. The selection part selects the throttle opening degree calculated by the second throttle opening degree calculation part when the vehicle is controlled on the basis of the target drive force which is not caused by the operation by the driver and when the throttle opening degree falls out of the saturation region.

According to the present invention, the operation of the acceleration pedal by the driver need not be taken into consideration when the vehicle is controlled on the basis of the target drive force not caused by the operation by the driver. The target opening degree of a throttle is calculated on the basis of the target drive force, thus determining the speed change in correlation with the target drive force on the basis of an element other than the opening degree of an acceleration.

More preferably, the control apparatus further includes a first region determination part which determines as to whether or not the throttle opening degree calculated by the first throttle opening degree calculation part falls within a saturation region in which a rate of a change in throttle opening degree with respect to a change in drive force becomes greater than a predetermined value, and a second region determination part which determines as to whether or not the throttle opening degree calculated by the second throttle opening degree calculation part falls within the saturation region in which the rate of the change in throttle opening degree with respect to the change in drive force becomes greater than the predetermined value. The selection part selects the throttle opening degree calculated by the first throttle opening degree calculation part when the vehicle is controlled on the basis of the target drive force not caused by the operation by the driver and when the second region determination part determines that the throttle opening degree falls within the saturation region and the first region determination part determines that the throttle opening degree falls within the saturation region.

According to the present invention, although the operation of the acceleration pedal by the driver need not be taken into consideration when the vehicle is controlled on the basis of the target drive force not caused by the operation by the driver, there is not much difference between the target drive force based on the opening degree of an acceleration and the target drive force based on the element other than the opening degree of an acceleration since the drive force falls within the saturation region. As a consequence, the speed change can be determined by the use of the target opening degree of a throttle calculated on the basis of the opening degree of an acceleration by the driver, thus determining the speed change in association with the operation of the acceleration pedal.

More preferably, the control apparatus further includes a first region determination part which determines as to whether or not the throttle opening degree calculated by the first throttle opening degree calculation part falls within a saturation region in which a rate of a change in throttle opening degree with respect to a change in drive force becomes greater than a predetermined value, and a second region determination part which determines as to whether or not the throttle opening degree calculated by the second throttle opening degree calculation part falls within the saturation region in which the rate of the change in throttle opening degree with respect to the change in drive force becomes greater than the predetermined value. The selection part selects the throttle opening degree calculated by the second throttle opening degree calculation part when the vehicle is controlled on the basis of the target drive force not caused by the operation by the driver and when the second region determination part determines that the throttle opening degree falls within the saturation region and the first region determination part determines that the throttle opening degree falls out of the saturation region.

According to the present invention, when the vehicle is controlled on the basis of the target drive force not caused by the operation by the driver and when there is much difference between the target drive force calculated on the basis of the opening degree of an acceleration and the target drive force not caused by the operation by the driver, no problem arises even if the opening degree of a throttle is calculated by the use of the target drive force not caused by the operation by the driver without taking the operation of the acceleration by the driver into consideration.

More preferably, the selection part selects the throttle opening degree calculated in such a manner as not to become markedly different from a throttle opening degree calculated at a preceding time.

According to the present invention, the opening degree of a throttle can be hardly varied by regarding the value more approximate to the opening degree of a throttle calculated at the preceding time as the target opening degree of a throttle, thereby avoiding a busy shift when the speed change is controlled on the basis of the opening degree of a throttle.

More preferably, the automatic target drive force setting part is implemented by a vehicle posture stability control system or an operation-assisted control system.

According to the present invention, an optimum opening degree of a throttle can be calculated by arbitrating the drive force requested from the vehicle posture stability control system (such as a VSC, a VDIM, an ABS or a TRC) or the operation-assisted control system (such as a cruise control, a follow-up control or a pre-crush control) and the drive force requested on the basis of the operation of the acceleration by the driver, thus controlling the drive force.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart illustrating control of a program to be executed in an engine ECU illustrated in FIG. 2.

DESCRIPTION OF THE PREFERRED EMBODIMENTS

Figure 1:
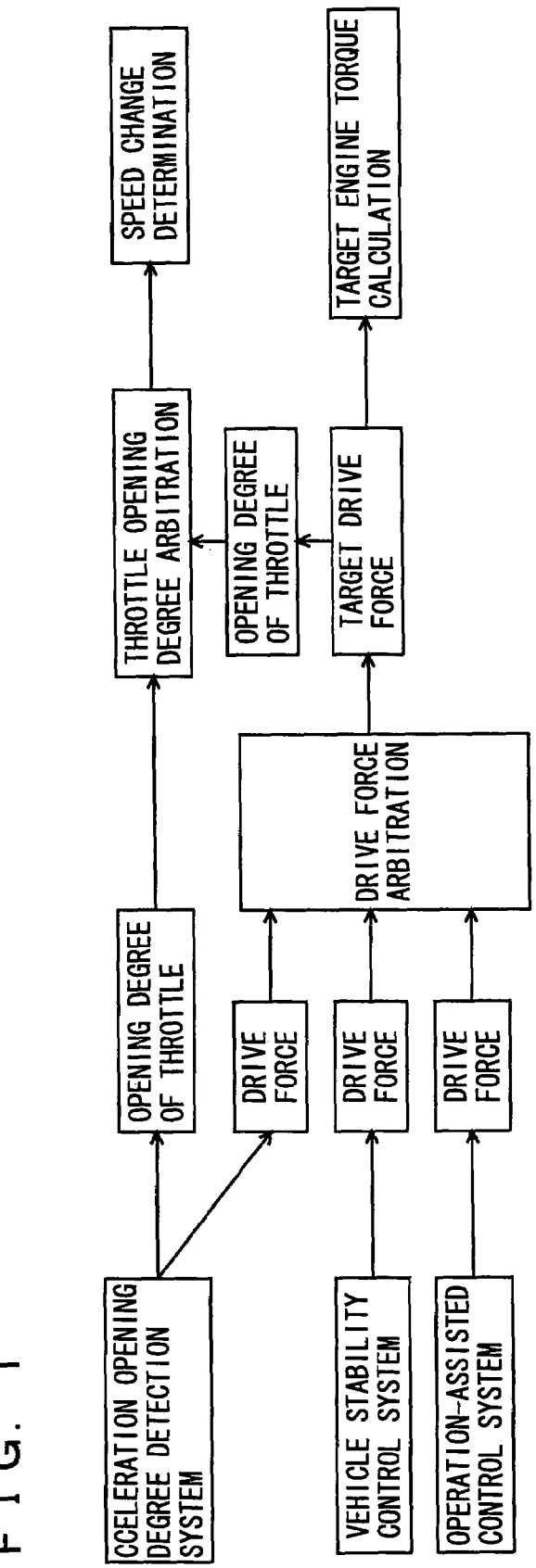
FIG. 1 is a diagram illustrating the entire configuration of a vehicle control system according to one embodiment of the present invention.

Description will be given below of an embodiment of the present invention with reference to the attached drawings. Like or corresponding component parts are designated by the same reference numerals in the description. Their terms and functions are the same as each other. Therefore, the detailed description will not be repeated.

Referring to FIG. 1, description will be given of the entire configuration of a vehicle control system according to the embodiment of the present invention.

The control system is adapted to control a drive system of a vehicle. Objects to be controlled of the drive system include an engine serving as a drive source and an automatic transmission connected to the engine (which is a shift-wise automatic transmission herein). Normally, there are a brake system (i.e., a brake) and a steering system (i.e., a steering wheel) in addition to the aforementioned drive system, and thus, all of the systems achieve basic performances of a vehicle such as traveling, stopping and curving operations.

The control system includes an acceleration opening degree detection system (i.e., an acceleration opening degree sensor) as an input system. A drive force calculated on the basis of an element other than an acceleration operation is calculated by a vehicle stability control system (such as a VSC, a VDIM, an ABS or a TRC), an operation-assisted control system (such as a cruise control, a follow-up control or a pre-crush control) or the like.

A vehicle stability control is directed to controlling a brake or a drive force in order to stabilize a vehicle posture, so as to turn the vehicle to a stable state in the case where the vehicle posture is accidentally turned to an unstable state due to the slippage of a tire or the like. The unstable state of the vehicle posture is detected by referring to a difference in rotational speed between a drive wheel and a rolling wheel or a difference in rotational speed between a right wheel and a left wheel or by using a yaw rate sensor or a G sensor, and thus, the possibility of the unstable state of the vehicle posture is predicted.

The drive force in the vehicle stability control is increased in the case of the lock of the tire, and thus, is used for turning the vehicle into a neutral state. Furthermore, the drive force is used for braking or reducing torque so as to produce a grip force in the case of the slippage of the tire.

An opening degree of a throttle (i.e., a target opening degree of a throttle) is calculated on the basis of an opening degree of an acceleration detected by the acceleration opening degree detection system. Moreover, the drive force is calculated on the basis of the opening degree of an acceleration. The drive force calculated on the basis of the opening degree of the acceleration, the drive force calculated by the vehicle stability control system and the drive force calculated by the operation-assisted control system are arbitrated each other. Arbitrating methods include a method for arbitrating the drive forces in accordance with a predetermined priority or an arbitrating method for selecting a maximum value or a minimum value.

The method for arbitrating the drive forces in accordance with the predetermined priority uses, as a target drive force, a drive force generated when a high priority control is performed. For example, since a pre-crush control is high in priority, a drive force generated by the pre-crush control is arbitrated as a target drive force when the pre-crush control is performed.

The arbitrating method for selecting a maximum value or a minimum value is directed to comparison of magnitude between a request on a torque-up side and a request on a torque-down side. Basically, the priority is high on the torque-down side. Examples of arithmetic expressions include MIN {torque-down by the vehicle stability control, MAX {torque requested according to the acceleration operation by the driver, torque requested by the cruise control, torque-up by the vehicle stability control}}. Here, the function MIN is adapted to select a minimum one among arguments. In contrast, the function MAX is adapted to select a maximum one among the arguments.

The opening degree of a throttle is calculated on the basis of the target drive force calculated as a result of the arbitration of the drive forces, and then, is arbitrated with the opening degree of a throttle calculated on the basis of the opening degree of an acceleration. The target drive force resulting from the arbitration of the drive forces is used in calculating a target engine torque. In addition, a speed change is determined on the basis of the arbitrated opening degree of a throttle, a vehicle speed and a speed change map.

Figure 2:
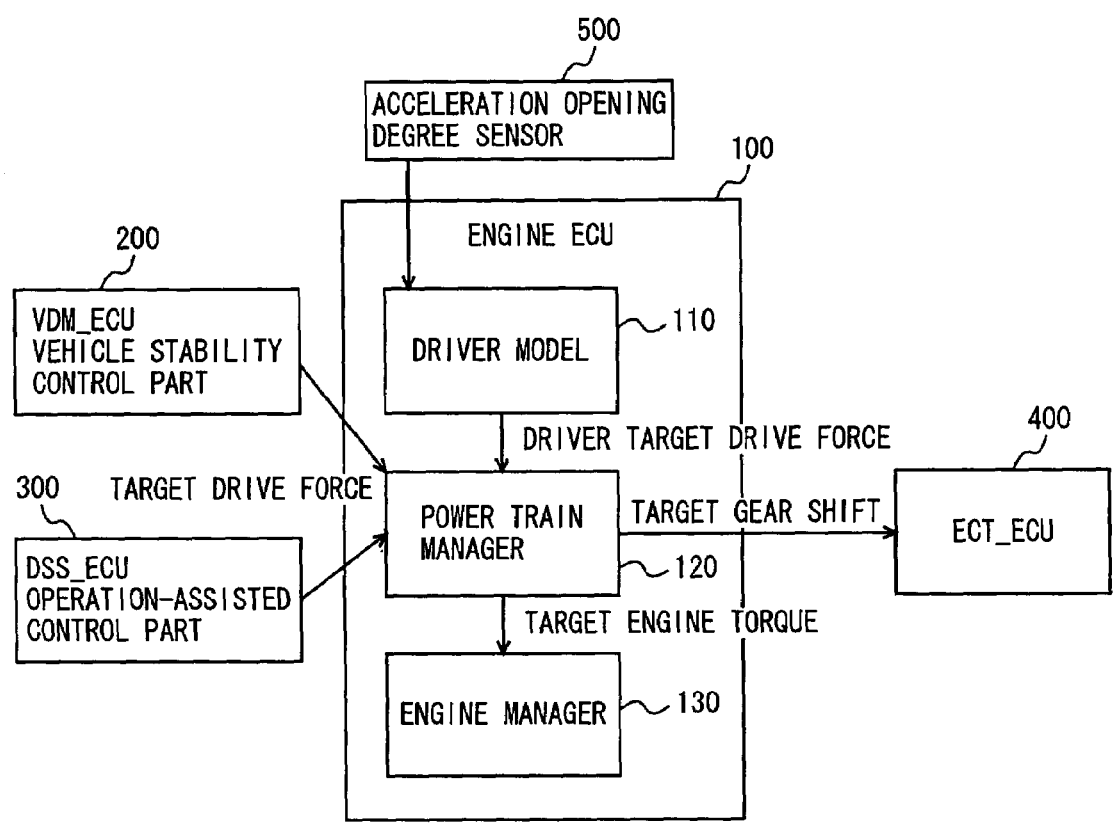
FIG. 2 is a block diagram illustrating hardware for achieving the control system illustrated in FIG. 1.

FIG. 2 is a block diagram illustrating hardware for achieving the control system illustrated in FIG. 1. The drive system control is directed to mainly an engine ECU (Electronic Control Unit) 100 and an ECT (Electronically Controlled Automatic Transmission)_ECU 400.

As described with reference to FIG. 1, the target drive force (before the arbitration) is input into engine ECU 100 from a VDM (Vehicle Dynamics Management)_ECU 200 serving as a vehicle stability control part or a DSS (Driving Support System)_ECU 300 serving as an operation-assisted control part. Engine ECU 100 includes a driver model 110, a power train manager 120 and an engine manager 130. For example, driver model 110 is designed to calculate a driver target drive force on the basis of the opening degree of an acceleration detected by an acceleration opening degree sensor 500. At this time, an operation mode (such as a power mode or an economy mode) or preferences of the driver may be reflected on the driver target drive force.

Power train manager 120 arbitrates the target drive force input from VDM_ECU 200 or DSS_ECU 300 with the driver target drive force input from driver model 110, thereby calculating the target drive force. A target gear shift and a target engine torque are calculated on the basis of the arbitrated target drive force, although described in details later. The calculated target gear shift is output from power train manager 120 to ECT_ECU 400. In contrast, the calculated target engine torque is output from power train manager 120 to engine manager 130.

Figure 3:
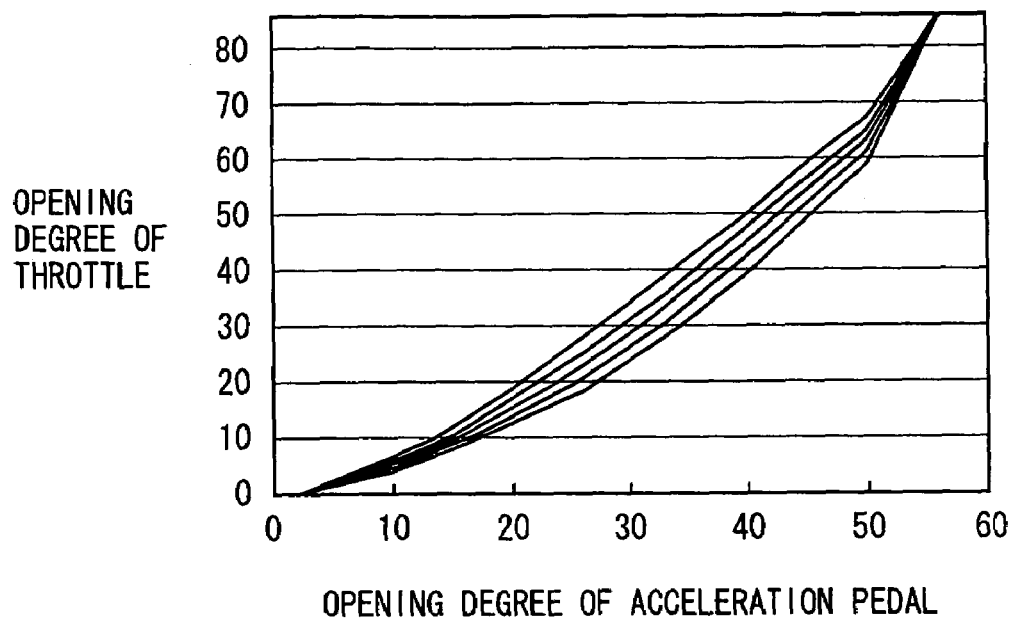
FIG. 3 is a graph illustrating the relationship between an opening degree of an acceleration pedal and an opening degree of a throttle.

Referring to FIG. 3, description will be given of a map for use in converting the opening degree of an acceleration pedal into the opening degree of a throttle by driver model 110. FIG. 3 illustrates a map per gear shift, in which a horizontal axis expresses the opening degree of an acceleration pedal while a vertical axis expresses the opening degree of a throttle. Basically, a positive correlation is established between the opening degree of an acceleration pedal and the opening degree of a throttle. Namely, the opening degree of a throttle becomes greater as the opening degree of an acceleration pedal becomes greater. At this time, the operation mode (such as the power mode or the economy mode) or the preferences of the driver may be reflected on the map, as described above.

Figure 4:
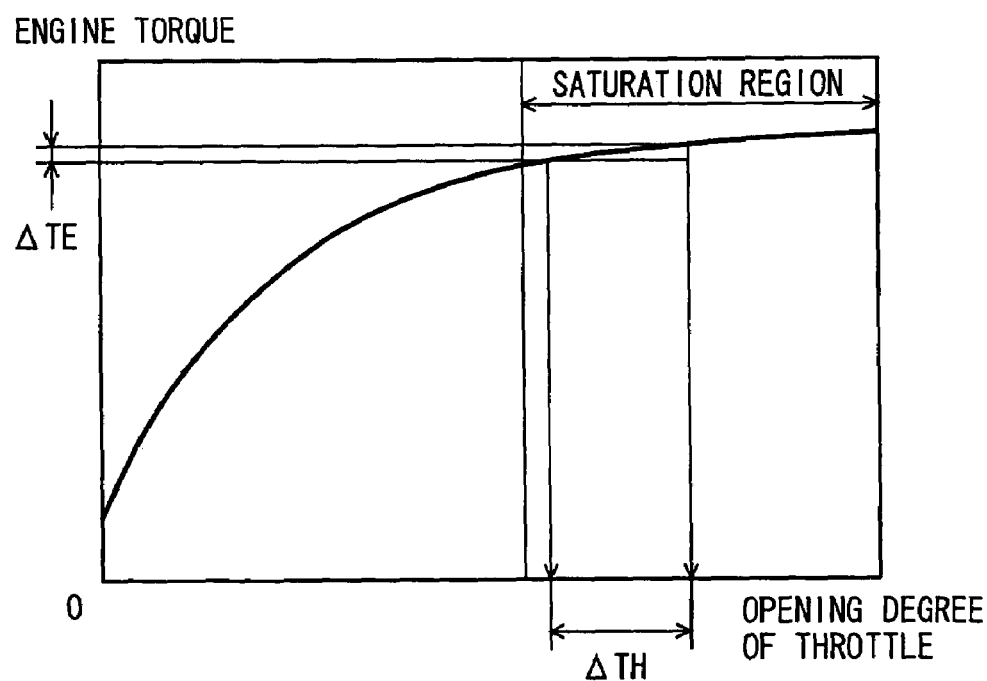
FIG. 4 is a graph illustrating the relationship between the opening degree of a throttle and an engine torque.

FIG. 4 is a graph illustrating the relationship between the opening degree of a throttle and the engine torque. FIG. 4 illustrates a curve of characteristics of the engine, in which a horizontal axis expresses the opening degree of a throttle while a vertical axis expresses the engine torque. Characteristically, there is a saturation region in which the engine torque cannot be increased even if the opening degree of a throttle is more increased after the opening degree of a throttle is increased up to a given value, as illustrated in FIG. 4. This shows that the opening degree of a throttle falls within the saturation region when a rate of a change in opening degree of a throttle with respect to a change in drive force exceeds a predetermined value. In other words, if the opening degree of a throttle is changed ($\Delta$TH) in order to change the engine torque (i.e., the drive force) ($\Delta$TE), a slight change in drive force markedly varies the opening degree of a throttle in the saturation region. Since the opening degree of a throttle is one of parameters of the speed change map in addition to the vehicle speed, the markedly varied opening degree of a throttle traverses a speed change line, thereby inducing a possibility of an unnecessary speed change.

Referring to FIG. 5, description will be given of the control of a program to be executed in ENG_ECU 100 (i.e., engine ECU 100) illustrated in FIG. 2, serving as a control apparatus in this embodiment. Incidentally, the program illustrated in a flowchart is repeated at a predetermined time interval when the engine is being driven.

In step (hereinafter, abbreviated to "S") 100, engine ECU 100 determines as to whether or not a drive force arbitration result is calculated on the basis of the acceleration operation. If the drive force arbitration result is calculated on the basis of the acceleration operation (YES in S100), the process proceeds to S110. If not (NO in S100), the process proceeds to S120.

In S110, engine ECU 100 calculates the target opening degree of a throttle on the basis of the opening degree of an acceleration.

In S120, engine ECU 100 determines as to whether or not the request drive force converted into the engine torque falls within the saturation region. If the request drive force converted into the engine torque falls within the saturation region (YES in S120), the process proceeds to S122. If not (NO in S120), the process proceeds to S140.

In S122, engine ECU 100 determines as to whether or not the engine torque obtained by the conversion exceeds a maximum value of the engine torque. If the engine torque obtained by the conversion exceeds the maximum value of the engine torque (YES in S122), the process proceeds to S124. If not (NO in S122), the process proceeds to S130. In S124, engine ECU 100 sets the target opening degree of a throttle to a maximum opening degree of a throttle.

In S130, engine ECU 100 determines as to whether or not the engine torque, into which the drive force calculated on the basis of the opening degree of the acceleration is converted, falls within the saturation region. If the engine torque, into which the drive force calculated on the basis of the opening degree of the acceleration is converted, falls within the saturation region (YES in S130), the process proceeds to S110. If not (NO in S130), the process proceeds to S150.

In S140, engine ECU 100 calculates the target opening degree of a throttle on the basis of the target drive force. In S150, engine ECU 100 calculates a value more approximate to an opening degree of a throttle at a preceding time as the target opening degree of a throttle (that is, avoids a busy shift).

In S160, engine ECU 100 determines as to whether or not the speed is changed in the automatic transmission on the basis of the target opening degree of a throttle. At this time, engine ECU 100 outputs a signal indicating a target gear shift to ECT_ECU 400.

Next, description will be given of operation of a vehicle mounting thereon the control apparatus according to this embodiment, which is configured as described above and is operated in accordance with the aforementioned flowchart.

(Case Where Drive Force Calculated on the Basis of Opening Degree of Acceleration is Selected as Result of Drive Force Arbitration)

When the request drive force is calculated by the operation of the acceleration pedal by the driver during traveling of the vehicle, and further, the request drive force from the movement control apparatus is calculated, the request drive force is arbitrated. As a result of the drive force arbitration, in the case where the drive force calculated on the basis of the opening degree of an acceleration is selected (YES in S100), the target opening degree of a throttle is calculated on the basis of the opening degree of an acceleration (S110). The target gear shift of the automatic transmission is determined on the basis of the target opening degree of a throttle, thereby determining the speed change (S160).

In this manner, the speed change in correlation with also the drive force can be determined in consideration of the operation of the acceleration pedal by the driver.

(Case Where Drive Force Calculated on the Basis of Element Other than Opening Degree of Acceleration is Selected as Result of Drive Force Arbitration)

As a result of the drive force arbitration, in the case where the drive force calculated on the basis of the opening degree of an acceleration is not selected (NO in S100), and further, the request drive force falls out of the saturation region of the engine torque (NO in S120), the target opening degree of a throttle can be unitarily calculated on the basis of the target drive force calculated on the basis of the element other than the opening degree of an acceleration. As a consequence, the target opening degree of a throttle can be calculated on the basis of the target drive force (S140). The target gear shift of the automatic transmission is determined on the basis of the target opening degree of a throttle, thereby determining the speed change (S160).

In this manner, the operation of the acceleration pedal by the driver need not be taken into consideration as a result of the arbitration, thereby calculating the target opening degree of a throttle on the basis of the target drive force, so as to determine the speed change in correlation with the target drive force on the basis of the element other than the opening degree of an acceleration.

In the meantime, in the case where the request drive force falls in the saturation region of the engine torque (YES in S120), the converted engine torque does not exceed the maximum value of the engine torque (NO in S122), and further, the drive force calculated on the basis of the opening degree of an acceleration falls in the saturation region of the engine torque (YES in S130), the target opening degree of a throttle is calculated on the basis of the opening degree of an acceleration (S110). The target gear shift of the automatic transmission is determined on the basis of the target opening degree of a throttle, thereby determining the speed change (S160).

In this manner, although the operation of the acceleration pedal by the driver need not be taken into consideration as a result of the arbitration, there is no much difference between the target drive force based on the opening degree of an acceleration and the target drive force based on the element other than the opening degree of an acceleration since the drive force per se falls in the saturation region. As a consequence, the speed change is determined by the use of the target opening degree of a throttle calculated on the basis of the opening degree of an acceleration operated by the driver, thus determining the speed change in association with the operation of the acceleration pedal. Thus, it is possible to avoid the driver from feeling any abnormality.

Moreover, in the case where the request drive force falls in the saturation region of the engine torque (YES in S120), the converted engine torque does not exceed the maximum value of the engine torque (NO in S122), and further, the drive force calculated on the basis of the opening degree of an acceleration falls out of the saturation region of the engine torque (NO in S130), the target opening degree of a throttle is calculated on the basis of the target drive force other than the opening degree of an acceleration. At this time, the value more approximate to the opening degree of a throttle at the preceding time is regarded as the target opening degree of the throttle (S150). The target gear shift of the automatic transmission is determined on the basis of the target opening degree of a throttle, thereby determining the speed change (S1160).

In this manner, since the difference between the target drive force calculated on the basis of the opening degree of an acceleration and the target drive force after the arbitration is great, no problem arises even if the operation of the acceleration by the driver is ignored. The value more approximate to the opening degree of a throttle at the preceding time is regarded as the target opening degree of a throttle, thereby avoiding any busy shift.

Additionally, in the case where the request drive force falls in the saturation region of the engine torque (YES in S120), and further, the converted engine torque exceeds the maximum value of the engine torque (YES in S122), the target opening degree of a throttle is set to the maximum opening degree of a throttle (S124).

In the aforementioned manner, the drive system can be controlled in consideration of both of the drive force requested by the operation of the acceleration by the driver and the drive force requested by the vehicle control apparatus (which performs the vehicle stability control or the operation-assisted control).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a vehicle including an internal combustion engine and an automatic transmission connected to said internal combustion engine, said control apparatus comprising:

acceleration opening degree detection means for detecting an opening degree of an acceleration pedal;

target drive force setting means for setting a target drive force on the basis of said detected acceleration pedal opening degree;

first throttle opening degree calculation means for calculating a first opening degree of a throttle on the basis of said detected acceleration pedal opening degree;

second throttle opening degree calculation means for calculating a second opening degree of a throttle corresponding to said set target drive force;

determination means for determining as to whether or not a speed is changed in said automatic transmission on the basis of said calculated first or second throttle opening degree; and selection means for selecting either the first throttle opening degree calculated by said first throttle opening degree calculation means or the second throttle opening degree calculated by said second throttle opening degree calculation means on the basis of a predetermined condition, wherein said determination means includes means for determining as to whether or not the speed is changed on the basis of said selected throttle opening degree.

2. The control apparatus for a vehicle according to claim 1, further comprising: automatic target drive force setting means for setting a target drive force not caused by operation by a driver.

3. The control apparatus for a vehicle according to claim 2, further comprising:
  means for determining as to whether or not the second throttle opening degree calculated by said second throttle opening degree calculation means falls within a saturation region in which a rate of a change in throttle opening degree with respect to a change in drive force becomes greater than a predetermined value, wherein
  said selection means includes means for selecting the second throttle opening degree calculated by said second throttle opening degree calculation means when the vehicle is controlled on the basis of said target drive force not caused by the operation by the driver and when the second throttle opening degree falls out of said saturation region.

4. The control apparatus for a vehicle according to claim 2, further comprising:
  first region determination means for determining as to whether or not the first throttle opening degree calculated by said first throttle opening degree calculation means falls within a saturation region in which a rate of a change in throttle opening degree with respect to a change in drive force becomes greater than a predetermined value; and
  second region determination means for determining as to whether or not the second throttle opening degree calculated by said second throttle opening degree calculation means falls within the saturation region in which the rate of the change in throttle opening degree with respect to the change in drive force becomes greater than the predetermined value, wherein
  said selection means includes means for selecting the first throttle opening degree calculated by said first throttle opening degree calculation means when the vehicle is controlled on the basis of said target drive force not caused by the operation by the driver and when said second region determination means determines that the second throttle opening degree falls within the saturation region and said first region determination means determines that the first throttle opening degree falls within the saturation region.

5. The control apparatus for a vehicle according to claim 2, further comprising:
  first region determination means for determining as to whether or not the first throttle opening degree calculated by said first throttle opening degree calculation means falls within a saturation region in which a rate of a change in throttle opening degree with respect to a change in drive force becomes greater than a predetermined value; and
  second region determination means for determining as to whether or not the second throttle opening degree calculated by said second throttle opening degree calculation means falls within the saturation region in which the rate of the change in throttle opening degree with respect to the change in drive force becomes greater than the predetermined value, wherein
  said selection means includes means for selecting the second throttle opening degree calculated by said second throttle opening degree calculation means when the vehicle is controlled on the basis of said target drive force not caused by the operation by the driver and when said second region determination means determines that the second throttle opening degree falls within the saturation region and said first region determination means determines that the first throttle opening degree falls out of the saturation region.

6. The control apparatus for a vehicle according to claim 5, wherein
  said selection means includes means for selecting the throttle opening degree calculated in such a manner as not to become markedly different from a throttle opening degree calculated at a preceding time.

7. The control apparatus for a vehicle according to any one of claims 2 to 6, wherein
  said automatic target drive force setting means is implemented by a vehicle posture stability control system or an operation-assisted control system.

8. A control apparatus for a vehicle including an internal combustion engine and an automatic transmission connected to said internal combustion engine, said control apparatus comprising:
  an acceleration opening degree detection part to detect an opening degree of an acceleration pedal;
  a target drive force setting part to set a target drive force on the basis of said detected acceleration pedal opening degree;
  a first throttle opening degree calculation part to calculate an opening degree of a throttle on the basis of said detected acceleration pedal opening degree;
  a second throttle opening degree calculation part to calculate an opening degree of a throttle corresponding to said set target drive force;
  a determination part to determine as to whether or not a speed is changed in said automatic transmission on the basis of said calculated throttle opening degree; and
  a selection part to select either one of the throttle opening degree calculated by said first throttle opening degree calculation part and the throttle opening degree calculated by said second throttle opening degree calculation part on the basis of a predetermined condition, wherein
  said determination part determines as to whether or not the speed is changed on the basis of said selected throttle opening degree.

9. The control apparatus for a vehicle according to claim 8, further comprising:
  an automatic target drive force setting part to set a target drive force not caused by operation by a driver.

10. The control apparatus for a vehicle according to claim 9, further comprising:
  a processing part to determine as to whether or not the second throttle opening degree calculated by said second throttle opening degree calculation part falls within a saturation region in which a rate of a change in throttle opening degree with respect to a change in drive force becomes greater than a predetermined value, wherein
  said selection part selects the second throttle opening degree calculated by said second throttle opening degree calculation part when the vehicle is controlled on the basis of said target drive force which is not caused by the operation by the driver and when the second throttle opening degree falls out of said saturation region.

11. The control apparatus for a vehicle according to claim 9, further comprising:
  a first region determination part to determine as to whether or not the first throttle opening degree calculated by said first throttle opening degree calculation part falls within a saturation region in which a rate of a change in throttle opening degree with respect to a change in drive force becomes greater than a predetermined value; and a second region determination part to determine as to whether or not the second throttle opening degree calculated by said second throttle opening degree calculation part falls within the saturation region in which the rate of the change in throttle opening degree with respect to the change in drive force becomes greater than the predetermined value, wherein said selection part selects the first throttle opening degree calculated by said first throttle opening degree calculation part when the vehicle is controlled on the basis of said target drive force not caused by the operation by the driver and when said second region determination part determines that the second throttle opening degree falls within the saturation region and said first region determination part determines that the first throttle opening degree falls within the saturation region.

12. The control apparatus for a vehicle according to claim 9, further comprising:

a first region determination part to determine as to whether or not the first throttle opening degree calculated by said first throttle opening degree calculation part falls within a saturation region in which a rate of a change in throttle opening degree with respect to a change in drive force becomes greater than a predetermined value; and a second region determination part to determine as to whether or not the second throttle opening degree calculated by said second throttle opening degree calculation part falls within the saturation region in which the rate of the change in throttle opening degree with respect to the change in drive force becomes greater than the predetermined value, wherein said selection part selects the second throttle opening degree calculated by said second throttle opening degree calculation part when the vehicle is controlled on the basis of said target drive force not caused by the operation by the driver and when said second region determination part determines that the second throttle opening degree falls within the saturation region and said first region determination part determines that the first throttle opening degree falls out of the saturation region.

13. The control apparatus for a vehicle according to claim 12, wherein said selection part selects the throttle opening degree calculated in such a manner as not to become markedly different from a throttle opening degree calculated at a preceding time.

14. The control apparatus for a vehicle according to any one of claims 9 to 13, wherein said automatic target drive force setting part is implemented by a vehicle posture stability control system or an operation-assisted control system.

* * * * *